United States Patent [19]
Rao et al.

[11] Patent Number: 5,295,143
[45] Date of Patent: Mar. 15, 1994

[54] THREE COLOR LASER

[75] Inventors: Rama Rao, Shoreham; Victor Garkavy, Brooklyn, both of N.Y.; Max W. Eagleson, Keota, Okla.; Richard C. Sam, Agoura Hills, Calif.

[73] Assignee: Excel Quantronix, Hauppauge, N.Y.

[21] Appl. No.: 880,214

[22] Filed: May 6, 1992

[51] Int. Cl.⁵ ............................................. H01S 3/10
[52] U.S. Cl. ........................................... 372/22; 359/328
[58] Field of Search ................... 372/22; 359/328, 329, 359/859

[56] References Cited
U.S. PATENT DOCUMENTS

| | | | |
|---|---|---|---|
| 4,812,030 | 3/1989 | Pinson | 359/859 |
| 4,824,220 | 4/1989 | Yamamoto et al. | 372/22 |
| 5,068,546 | 11/1991 | Hemmerich et al. | 372/22 |
| 5,139,494 | 8/1992 | Freiberg | 606/3 |

Primary Examiner—Rodney B. Bovernick
Assistant Examiner—Robert E. Wise
Attorney, Agent, or Firm—Darby & Darby

[57] ABSTRACT

A three color laser system employs a diode pumped Nd:YAG or Nd:YLF laser to provide a green output beam and to pump two Ti:S lasers. One Ti:S laser emits a tunable red beam, while the second emits a near infrared beam. The near infrared beam is frequency doubled by a NLO device to provide a tunable blue output beam. The beams may be directed to separate optical fibers or to a single fiber. A reversed Cassegrainian mirror arrangement is used to combine a plurality of beams for transmission in a single optical fiber.

16 Claims, 2 Drawing Sheets

THREE COLOR LASER

FIELD OF THE INVENTION

This invention relates to three color lasers, and, more particularly, to red/green/blue ("RGB") lasers. An aspect of the invention also relates to beam combiners for directing a plurality of laser beams into a single optical fiber.

BACKGROUND OF THE INVENTION

RGB lasers have a wide variety of uses. For example, RGB lasers can be used for optical data storage, color printing, color displays, bar code scanning, multispectral detection, and reprographics.

Optical data storage is among the most common of laser applications. Optical data storage technologies include computer, compact disk ("CD") video playback, and other digital storage. Optical data storage is expected to become increasingly ubiquitous in the coming years, due in part to advances in full color and motion video, and CD photograph storage.

The success of the monochrome 300 dot per inch ("dpi") laser printers has created a need to develop color laser printing. Color laser printing applications include color facsimiles, photocopying, and laser color printing, which require 1-5 milliWatts ("mW") of power in small to medium sized laser packages.

Color display applications include personal and projection TVs, and computer graphics. The power requirements for these applications depend on the screen size, and range from 3 mW to 3 W. Advancement of this market is stalled because of size, cost, and the nature of the ion and diode lasers required to generate visible wavelength light. The main impediment to the use of RGB lasers for color displays is the development of a blue beam source.

The RGB laser may be used for colored bar code scanning. Advances in RGB lasers could result in an increased interest in colored bar code scanning.

Certain military, scientific and medical applications identify targets by observing spectral reflections of an object's surface. RGB lasers provide pure spectral sources for such detection. By using an RGB laser with a gated imaging camera having different spectral filters, numerous objects can be accurately identified at large distances. Medical applications include fiber optic probes, laboratory chemical assays, photoactivated therapies, tissue imaging, and in vivo chemical assays.

Reprographics applications include color separation, plate making and scanning. As color display systems become increasingly common, the need for color scanning systems will increase as well.

RGB lasers are generally known. U.S. Pat. No. 4,866,702 to Holly discloses a multicolored laser source comprising two Nd:YAG lasers. In Holly, a 532 nanometer ("nm") beam is generated as the second harmonic of the first laser output. The second laser output is used to generate second and third harmonics at 680 mn and 440 mn respectively.

U.S. Pat. No. 4,338,578 to Sukhman discloses a low pulse frequency RGB laser, wherein ruby laser output and Nd:YAG output are used to create three colors. The ruby laser provides a 694 mn beam which is applied to a mixing crystal; the Nd:YAG laser creates a 1064 nm beam which is also directed to the mixing crystal.

U.S. Pat. No. 5,048,911 to Sang et al. discloses a method and apparatus for coupling several laser beams of the same wavelength a single optical fiber. Sang et al. teach combining several laser beams onto a single optical fiber by separately steering each beam onto a converging lens, which lens converges the beam onto the optical fiber. The entire disclosure of each of the aforementioned U.S. patents is expressly incorporated herein by reference.

The growing number of color laser applications demands the development of smaller, more efficient RGB laser systems.

SUMMARY OF THE INVENTION

The present invention is an RGB laser comprising several laser modules. In a presently preferred embodiment, a diode pumped Nd:YLF or Nd:YAG laser provides an infrared beam which is frequency doubled to provide both a green output beam and a green pump beam. The green pump beam pumps two tunable titanium sapphire ("Ti:S") lasers. Ti:S lasers have a broad tuning range (800 nm peak, 300 nm bandwidth) combined with exceptional material, chemical and mechanical properties, and are ideally suited for this application.

One Ti:S laser emits a red output beam having a wavelength tunable between 670-700 nm. The second Ti:S laser emits a near infrared beam having a wavelength tunable between 850-950 mn. Frequency doubling the near infrared beam provides a blue output beam with a wavelength tunable between 425-475 nm. The disclosed preferred embodiment provides the following desirable output performance characteristics:

red at 700 nm: 50-100 mW;
green at 527 nm: 100 mW; and
blue at 450 mn: 25-50 mW.

Moreover, the residual near infrared beam from the second Ti:S laser is also available as a fourth beam where desired. Because the Ti:S lasers are independently tunable, the exact wavelengths of the three primary colors may be achieved and, thus, the output beams may be used to generate white light.

All output beams have a Gaussian profile.

The output beams may be directed into three separate optical fibers or, more preferably, combined for transmission in a single fiber. The present invention is also directed to a novel beam combiner for transmitting all three beams in a single optical fiber. The beam combiner is essentially configured as a reversed Cassegrainian mirror arrangement.

BRIEF DESCRIPTION OF THE DRAWINGS

The foregoing features of the present invention will be more readily apparent from the following detailed description and drawings of an illustrative embodiment of the invention in which.

DESCRIPTION OF THE PREFERRED EMBODIMENTS

Figure 1:
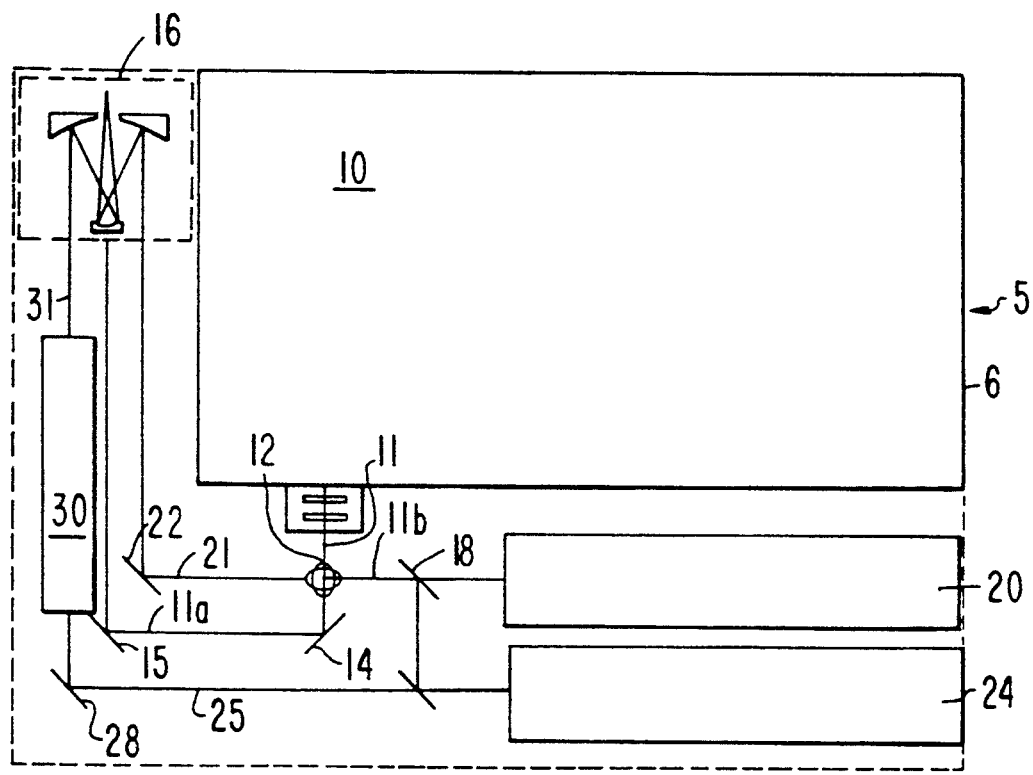
FIG. 1 is an optical diagram of an RGB laser according to the present invention.

FIG. 1 shows a preferred layout of the RGB laser according to the present invention. In this illustrated preferred embodiment, the RGB laser optical head (5) may be included in a compact, table-top package having dimensions of about 20"×17"×7". The head (5) is defined generally by a rectangular base plate (6) to which the laser components are mounted. A diode pumped Nd:YAG or Nd:YLF laser (10) produces a coherent light beam in the infrared wavelength range, which is frequency doubled in any well known manner to create a visible green pump beam (11). As will be further explained in connection with an alternative embodiment, a portion of the infrared beam may be extracted before frequency doubling for use as a pumping source for a forsterite laser.

In the preferred embodiment, the green pump beam (11) is conventionally linearly polarized in order to provide a pump source (11b) to two Ti:S lasers (20,24). The presently preferred diode pumped laser for this application is the Model LDP-5000-6, available from Laser Diode, Inc., located in Earth City, Mo. The presently preferred Ti:S crystals are available from Crystal Systems, Inc., located in Salem, Mass.

The green pump beam (11) passes through a beam splitter (12), which transmits 10% of the output power as a green output beam (11a). Green output beam (11a) at 527 mn has power on the order of 100 mW, in this presently preferred embodiment. The green output beam (11a) is directed via first and second mirrors (14,15) to the beam combiner (16) for delivery to an optical fiber (not shown in FIG. 1).

The Ti:S pump beam (11b) is split by a third mirror (18) so that each Ti:S laser (20,24) is pumped by about 45% of the green pump beam's (11) original power (approximately 600 mW each).

One Ti:S laser (20) generates a red output beam (21) which is directed to the beam combiner (16) via a fourth mirror (22). The second Ti:S laser (24) generates an infrared beam (25) which is directed via a sixth mirror (28) to frequency doubling means, preferably an NLO device. In the preferred embodiment, the NLO device is a second harmonic generator ("SHG")(30), which produces a blue output beam (31). The second harmonic generator (30) may be a $LiIO_3$ or $KNbO_3$ crystal. The $KNbO_3$ crystal is preferable because it allows 90° non-critical phase-matching. The blue output beam (31) is then directed to the beam combiner (16).

Figure 2:
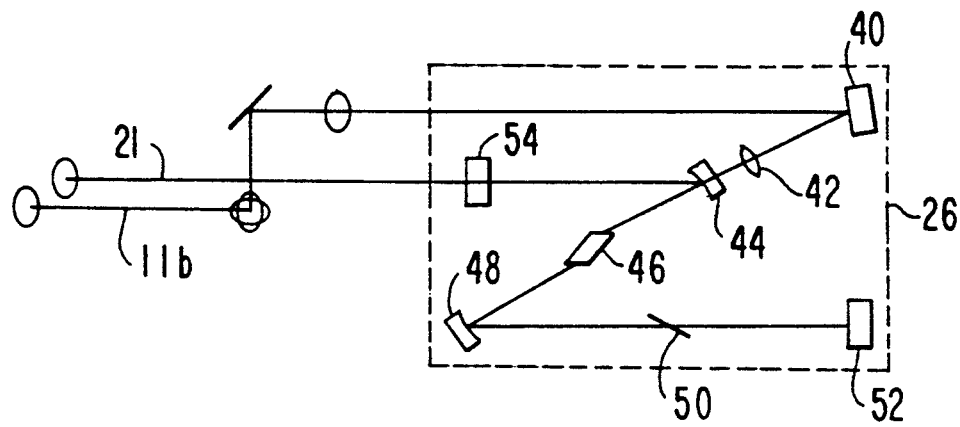
FIG. 2 is an optical diagram of a Ti:S laser of the present invention.

FIG. 2 shows the conventional tunable Ti:S laser layout. Principles of longitudinally pumped Ti:S laser oscillators, as well as resonator layouts and design rules, are set forth in U.S. Pat. No. 4,894,831 to A. J. Alfrey, entitled "Longitudinally Pumped Laser Oscillator," the entire disclosure of which is expressly incorporated herein by reference. Additional information may be found in Alfrey, A. J., Modeling of Longitudinally Pumped CW Ti:Sapphire Laser Oscillators, *IEEE Journal of Quantum Electronics*; Vol. 25, No. 4, pp. 760–66 (April 1989), the entire disclosure of which is also expressly incorporated herein by reference.

Each Ti:S laser is assembled as a module which is mounted on a plate (26). In order to provide a compact package, each Ti:S module plate (e.g. (26)), is mounted perpendicularly to the laser system base plate (6). In a preferred embodiment, each Ti:S laser module measures approximately 6"×10"×2.5".

Referring now to FIG. 2, the green pump beam (11b) is directed via a seventh mirror (40) to a collimator (42) and through a first partially reflecting concave mirror (44). Within the resonator, the beam passes through the mirror into the $Ti:Al_2O_3$ crystal (46), to a second concave mirror (48), and via a birefringent filter (50) to the eighth mirror (52), which delineates the physical and optical end of the resonator.

The red output beam (21) is extracted from the cavity through a partially reflecting mirror (54). The output beam is tunable in the range 670–700 nm, and has power on the order of 50–100 mW at 700 nm.

The second Ti:S laser (24) is similarly conventionally arranged, but is tuned to provide near-infrared output in the range 850–950 nm. The output (25) of this laser is applied to a SHG (30), as is described above. The blue output beam (31) at 450 mn has power on the order of 25–50 mW, in this disclosed embodiment.

Thus, a system has been disclosed which provides three color laser output from a single diode pumped solid state laser source.

Another presently preferred embodiment is especially useful in applications where true color fidelity is required. In such cases, the red output wavelength must be in the region of 605±10 nm. In order to provide such a red output beam, a fractional amount of the output of the diode pumped Nd:YAG or Nd:YLF laser is directly used, at 1054 mn or 1064 nm, respectively, to pump a forsterite laser ($Cr^{4+}:Mg_2SiO_4$), which replaces the first Ti:S laser (20) described above. A fraction of the infrared output is frequency doubled to green and is used as before, i.e., both as a green output beam (11a) and as a pump source (11b) for the second Ti:S laser (24).

The output of the forsterite laser is then conventionally frequency doubled to yield the necessary 605 nm±10 nm red output beam (21).

Many similar and other modifications may be readily devised without deviating from the scope or spirit of these inventions.

Figure 3:
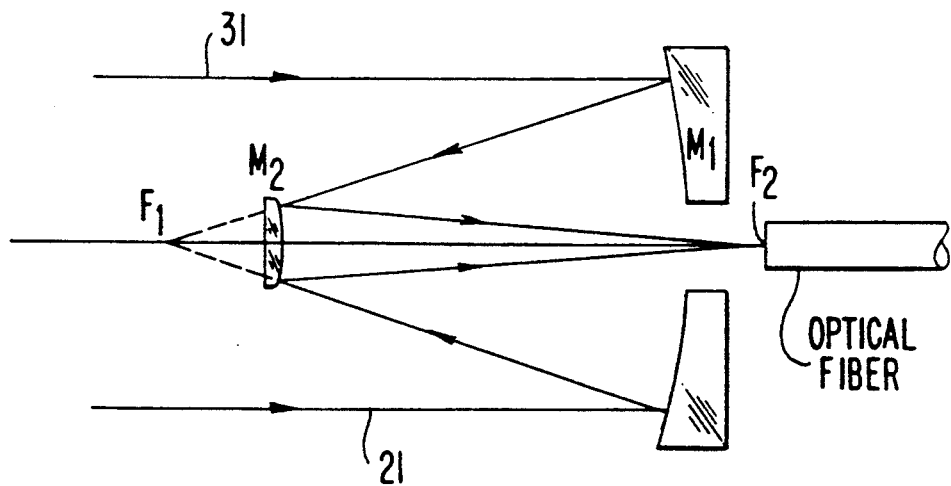
FIG. 3 shows a cross-sectional view of a beam combiner according to the present invention.

Another aspect of the inventive RGB laser is the novel manner in which the three color output is delivered. FIG. 3 shows a novel beam combiner for combining the green, red and blue beams for transmission in a single optical fiber. As will be readily appreciated, the optical design is essentially a reversed Cassegrainian mirror arrangement.

The two mirror Cassegrain arrangement is well known for its use in missile tracking instruments. Although FIG. 3 is now explained, for the sake of diagrammatic simplicity, as illustrating the combination of two output beams (e.g.,(21,31)) it will be understood that any plurality of beams may be combined in the same manner, as further explained below as well.

Two output beams (21,31) which are substantially parallel strike a concave primary mirror ($M_1$) and are reflected towards a focus ($F_1$). Before the reflected beams are converged, a convex secondary mirror, ($M_2$) interrupts the beams and reflects them to a second focus ($F_2$) located behind the primary mirror. The position of the second focus ($F_2$) outside the system puts it in an extremely convenient and favorable position for entry into an optical fiber.

As seen in FIG. 3, a central hole is provided in the primary mirror ($M_1$) to enable the twice reflected beams to reach the second focus ($F_2$).

There are an infinite number of combinations of the two mirror surfaces which will avoid spherical aberration of the beams at the second focus ($F_2$). For example, the primary mirror ($M_1$) can be spherical, in which case the secondary mirror ($M_2$) is a complex, higher order curve. Conversely, in a special case known as a Dall-Kirkham mirror arrangement, the secondary mirror ($M_2$) can be spherical, in which case the primary mirror ($M_1$) will be of a complex nature. In the preferred form, the primary mirror ($M_1$) is paraboloid with focus at ($F_1$)

and secondary mirror is hyperboloid with foci at ($F_1$) and ($F_2$).

As used in this specification, the phrase "Cassegrainian mirror arrangement" or "Cassegrainian arrangement" is intended to apply to any system consisting of a concave primary and convex secondary mirror wherein the twice reflected image passes through a hole in the primary mirror. This is the commonly accepted usage of these terms, even though Cassegrain's originally proposed system consisted of only the paraboloidal primary with an hyperboloidal secondary.

As will be readily appreciated, the primary mirror ($M_1$) is employed to collect the individual output beams, and the hyperboloidal secondary mirror ($M_2$) reflects the convergent beam to the input end of an optical fiber disposed at the appropriate focus ($F_2$) behind the primary mirror. Specific optical design techniques regarding Cassegrain systems are extremely well known, and are not repeated herein. It is important, however, to correctly choose appropriate reflecting surfaces ($M_1$, $M_2$) so that the total cone angle of the beams incident onto the fiber tip is smaller than the acceptance angle of the fiber as defined by the fiber's numerical aperture (NA). For an RGB laser, the presently preferred parameters are:

$M_1$ = a parabola of 3" diameter, focal length of 15.5 cm;

$M_2$ = a convex mirror of 1" diameter, having a 20 cm radius of curvature;

$\overline{M_{1(surface)} M_{2(surface)}} = 10$ cm; and $\overline{M_{1(surface)} F_2} = 2$ cm.

The maximum incidence angle of this design at the optical fiber tip is 6.04°. The beam will transmit through a fiber having a minimum NA of sin (6°)=0.105. Since the best fibers presently commercially available have NA of about 0.12, the design described above will work for most such commercially available optical fibers.

The number of beams which can be combined depends on the physical area of the primary mirror ($M_1$) and the cross-sectional areas of the individual beams. Thus, the number of beams to be combined can be increased or decreased by adjusting the cross-sectional size of the beams and the surface area of primary mirror ($M_1$).

This preferred beam combiner design has several unique advantages. First, no light dispersive elements are used; therefore, the design can combine laser beams from the near ultraviolet to the infrared regions. Also, only two mirrors are used regardless of the number of beams being combined.

While the invention has been particularly shown and described with reference to preferred embodiments thereof, it will be understood by those skilled in the art that various changes in form and detail may be made therein without departing from the spirit and scope of the invention.

What is claimed is:

1. Apparatus for producing three-color laser output, comprising:
   first means for producing a first beam of coherent light in the infrared wavelength range;
   second means for frequency doubling a fractional amount, up to one hundred percent, of the first beam to produce a second beam of coherent light in the visible wavelength range;
   third means for directing a fractional amount of the second beam out of the apparatus as a first output beam having a first output beam wavelength in the visible wavelength range;
   fourth means for using a fractional amount of one of said first and second beams to produce a second output beam for direction out of the apparatus, the second output beam having a second output beam wavelength in the visible wavelength range; and
   fifth means for using a fractional amount of the second beam to produce a third output beam for direction out of the apparatus, the third output beam having a third output beam wavelength in the visible wavelength range.

2. The apparatus of claim 1, wherein the first output beam is visible green light.

3. The apparatus of claim 1, wherein the second output beam is visible red light.

4. The apparatus of claim 1, wherein the third output beam is visible blue light.

5. The apparatus of claim 1, wherein the first output beam is visible green light, the second output beam is visible red light, and the third output beam is visible blue light.

6. The apparatus of claim 1, wherein the first means comprises a Nd:YAG or Nd:YLF laser.

7. The apparatus of claim 6, wherein the fourth means comprises a first Ti:S laser and the fifth means comprises a second Ti:S laser.

8. The apparatus of claim 7, wherein the fifth means further comprises sixth means for frequency doubling laser output of the second Ti:S laser to create the third output beam.

9. The apparatus of claim 6, wherein the fourth means comprises a forsterite ($Cr^{4+}:Mg_2SiO_4$) laser and the fifth means comprises a Ti:S laser.

10. The apparatus of claim 9, wherein the fifth means further comprises sixth means for frequency doubling laser output of the Ti:S laser to create the third output beam, and the fourth means further comprises seventh means for frequency doubling laser output of the forsterite laser to create the second output beam.

11. The apparatus of claim 1, wherein the fourth means comprises a first Ti:S laser and the fifth means comprises a second Ti:S laser.

12. The apparatus of claim 11, wherein the fifth means further comprises sixth means for frequency doubling laser output of the second Ti:S laser to create the third output beam.

13. The apparatus of claim 1, wherein the fourth means comprises a forsterite ($Cr^{4+}:Mg_2SiO_4$) laser and the fifth means comprises a Ti:S laser.

14. The apparatus of claim 13, wherein the fifth means further comprises sixth means for frequency doubling laser output of the Ti:S laser to create the third output beam, and the fourth means further comprises seventh means for frequency doubling laser output of the forsterite laser to create the second output beam.

15. The apparatus of claim 1, further comprising optical means for intercepting and combining the first, second and third output beams for further transmission in a single optical fiber.

16. The apparatus of claim 15, wherein the optical means comprises a reversed Cassegrainian mirror arrangement.

* * * * *